Figure 1:
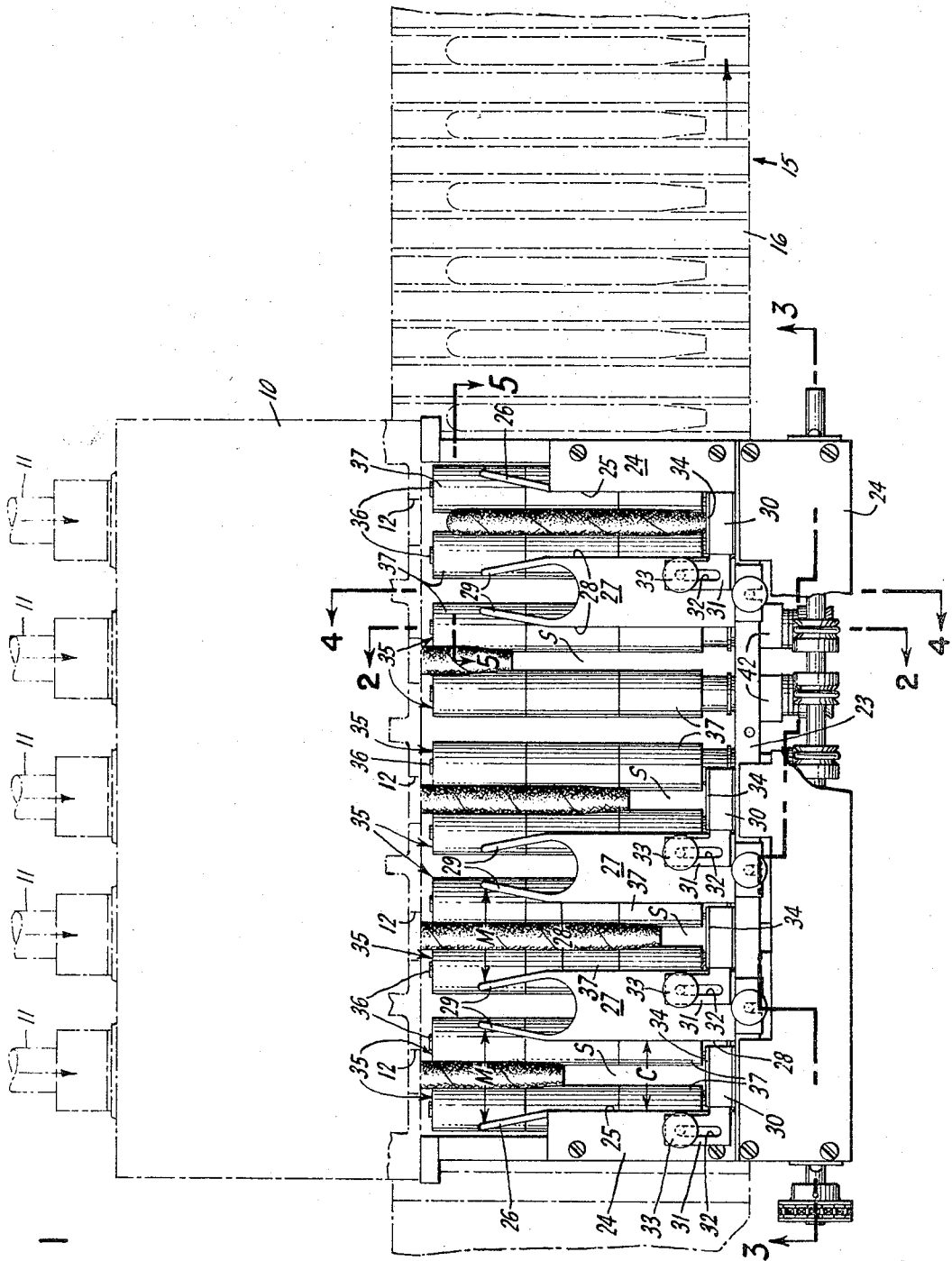

March 28, 1967 J. B. CHAMBERS ET AL 3,311,419

CONVEYING SYSTEM

Filed Jan. 13, 1966 3 Sheets-Sheet 1

FIG. I

INVENTORS
JEROME B. CHAMBERS
ROBERT P. DELLAQUILA
BY Charles J. Worth
AGENT

March 28, 1967    J. B. CHAMBERS ET AL    3,311,419
CONVEYING SYSTEM

Filed Jan. 13, 1966    3 Sheets-Sheet 2

INVENTORS
JEROME B. CHAMBERS
ROBERT P. DELLAQUILA
BY Charles J. Worth

AGENT

March 28, 1967 J. B. CHAMBERS ET AL 3,311,419
CONVEYING SYSTEM
Filed Jan. 13, 1966 3 Sheets-Sheet 3
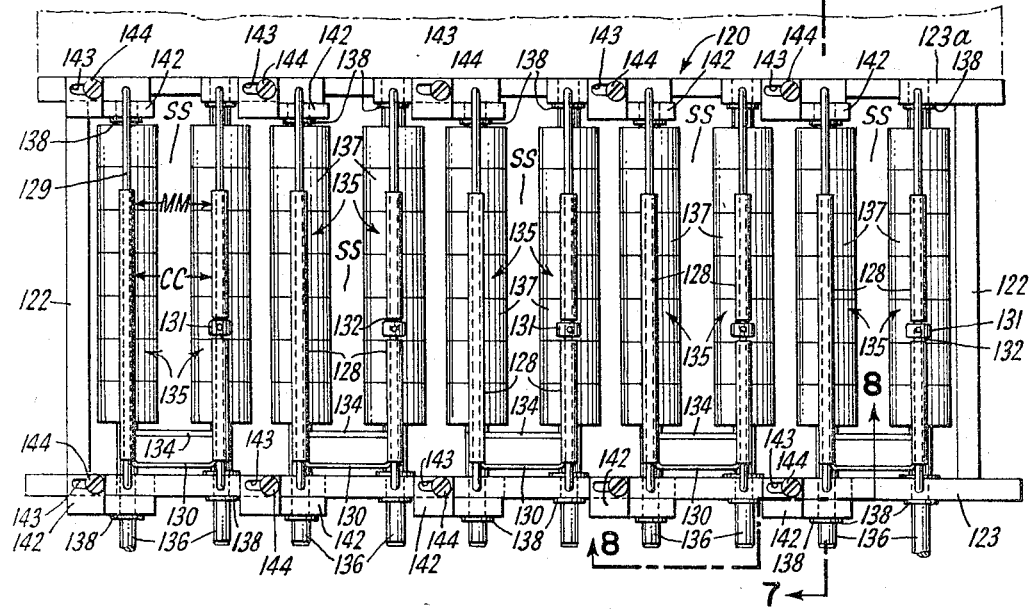
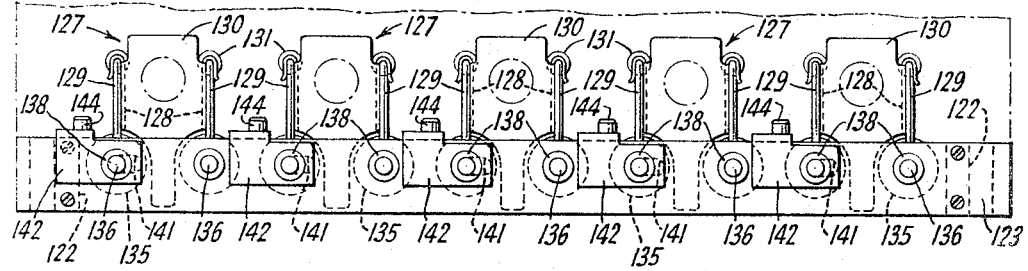
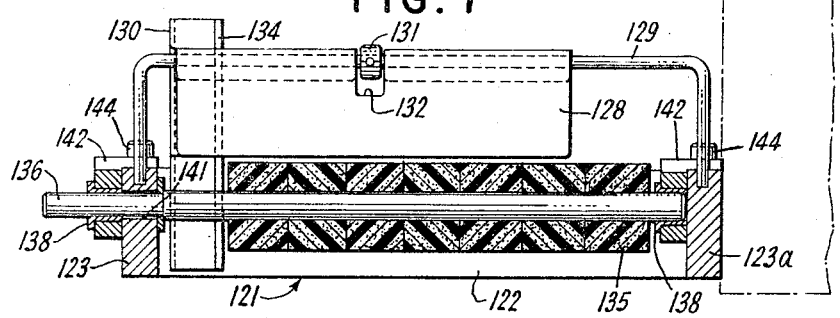
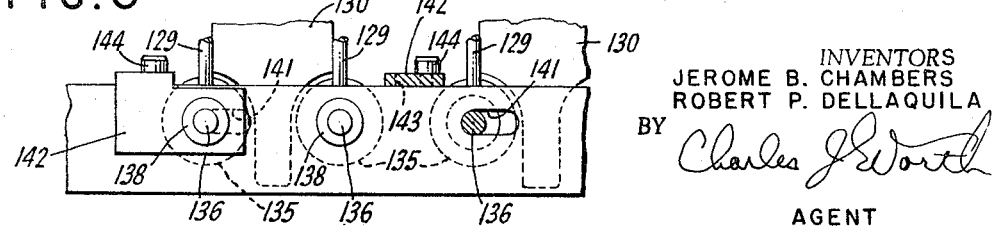
INVENTORS
JEROME B. CHAMBERS
ROBERT P. DELLAQUILA
BY Charles J. Worth
AGENT

United States Patent Office 3,311,419
Patented Mar. 28, 1967

3,311,419
CONVEYING SYSTEM
Jerome B. Chambers, Billings, Mont., and Robert P. Dellaquila, Astoria, N.Y., assignors to American Machine & Foundry Company, a corporation of New Jersey
Filed Jan. 13, 1966, Ser. No. 520,471
10 Claims. (Cl. 302—12)

This invention relates generally to conveyor systems and more particularly to a positive transfer device therefor for receiving conveyed articles from multiple sources and for continuously and positively transferring such articles to a single conveyor.

A transfer device made in accordance with the present invention would find utility in conveyor systems for articles of most any nature and shape. It is particularly adapted, however, to conveyor systems for articles requiring careful handling such as cigars, and will be shown and described in this environment.

An object of the present invention is to provide means for collecting articles conveyed from multiple sources and for positively and continuously transferring such articles to a single conveyor.

Another object of the present invention is to provide the foregoing device for handling frangible articles forceably ejected therefrom with no deleterious or destructive effects.

And another object of the present invention is to provide the foregoing device for positive transfer of articles to a compartmented conveyor to insure delivery of one of the articles to each compartment thereof.

The present invention contemplates a positive transfer device for cigar conveyor systems having a plurality of ducts for conveying cigars to the transfer device and an endless belt conveyor with recesses therein for receiving cigars from the transfer device, comprising a plurality of chute means each for receiving cigars ejected from one of the ducts, each of the ducts having resilient low density means to block cigars from passing therethrough and for absorbing shock resulting therefrom, roller means for providing a cushioned bottom for each of the ducts and defining a feed-out therein, the feed-out being smaller in width than the cigars fed therethrough, and the roller means providing resilient low density surfaces along the feed-out which is readily deformable to pass cigars therethrough.

The foregoing and other objects and advantages will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 2:
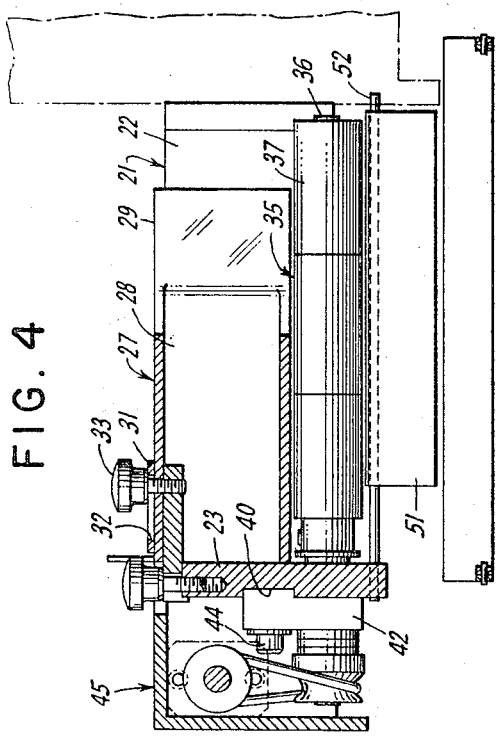
Figure 4:
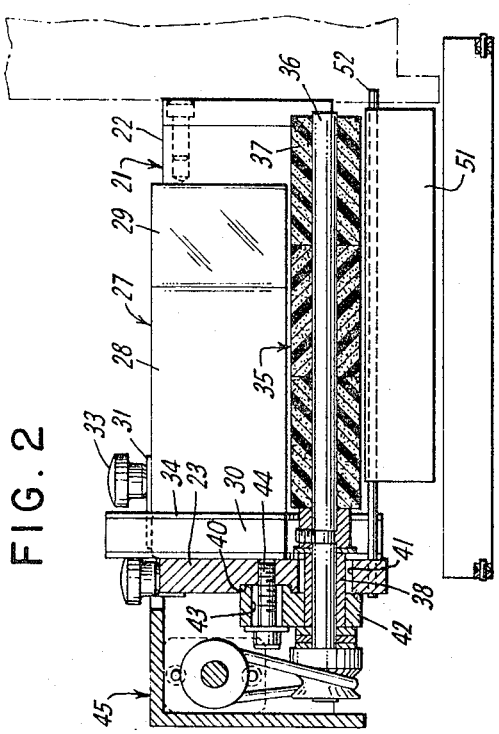
Figure 3:
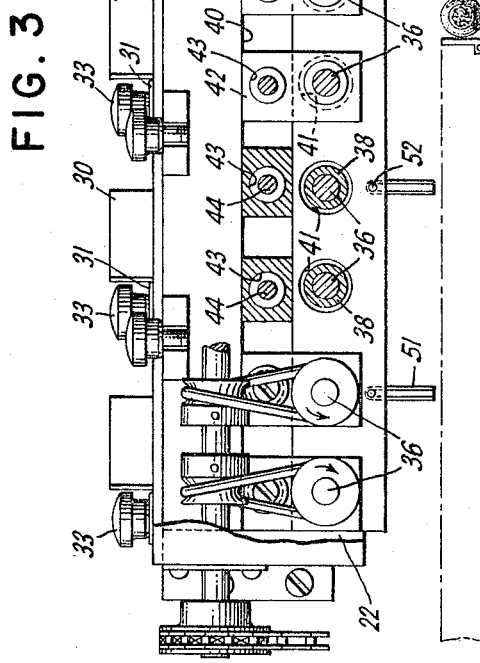

FIGURE 1 is a plan view of an intermediate portion of a conveying system having a positive transfer device made in accordance with the present invention, FIGURE 2 is an enlarged sectional view taken on line 2—2 of FIGURE 1 and through one of one of the pairs of feed rollers, FIGURE 3 is an enlarged multi-plane sectional view taken on line 3—3 of FIGURE 1 and through the roller drive end of the novel device, FIGURE 4 is an enlarged sectional view of a chute divider taken on line 4—4 of FIGURE 1, FIGURE 5 is an enlarged sectional view taken on line 5—5 of FIGURE 1 illustrating one of the chute dividers and the bumper attached thereto in elevation, FIGURE 6 is a plan view of a modification of the transfer device of FIGURE 1, with the roller drive portion removed therefrom, FIGURE 7 is an enlarged sectional view, similar to FIGURE 2, taken on line 7—7 of FIGURE 6 and through one of one of the pairs of feed rollers, and FIGURE 8 is a fragmentary elevational view of one chute section viewed from the plane of line 8—8 of FIGURE 6.

Referring now to the drawings and particularly to FIGURE 1, a positive transfer device 20 is preferably connected at one side to a suction manifold 10 and is disposed above an endless belt type conveyor 15, moving in the direction of the arrow thereon, having pockets or compartments 16 for receiving and holding cigars.

Manifold 10 has five pneumatic conveyor ducts 11 each connected to a source (not shown) of cigars, and a valved discharge opening 12 associated with each of the ducts 11 through which cigars are ejected from the manifold 10. The number of ducts 11 and associated manifold provisions therefor is arbitrarily chosen for descriptive purposes only and is determined in actual implementation by the demands of the specific conveying system. Thus, the number of infeed conveyor lines and corresponding chutes of the novel device as will be discussed may be varied, as required, from the specific number shown and described.

The novel transfer device 20 has a frame 21 connected to the manifold 10 by suitable conventional means (not shown) well known in the art. Frame 21 has a pair of spaced end walls 22 each connected to one end of a side wall 23 spaced from the side of frame 21 connected to manifold 10.

A divider member 24 is connected at each end of frame 21, in this instance to each end wall 22, by an suitable fastener means as shown. A plurality, in the instance four, intermediate divider members 27 are each connected at one end to frame 21, in this instance to wall 23, by any suitable fastener means and are disposed in substantially equally spaced series between divider members 24.

Referring also to FIGURES 4 and 5, each of the dividers 27 is boxline or of inverted U configuration, providing a pair of spaced vertical walls 28, which are parallel to one another, extending from the frame side wall 23 toward manifold 10 and terminating short of that side of frame 21. The end of each member 27 closer to manifold 10 is so formed or recessed, as shown, to provide walls 28 with offset free end portions 29 which converge toward one another. Each member 24, substantially half of a member 27, is of inverted L or C configuration and provides a vertical wall 25, corresponding to a wall 28, inwardly of the end wall 22 to which the member is attached and has an offset free end portion 26 which converges towards such end wall.

Divided members 24 and 27 are so positioned that the walls 25 and 28 thereof, when the novel transfer device 20 is connected to a manifold 10, define a plurality of parallel walled chutes C each axially alined with one of the ducts 11 and the associated valved discharge opening 12 therefor in manifold 10. The ends of chutes C closer to manifold 10 have enlarged feed-in or mouth portions M defined by the free end wall portions 26 and 29 while the other ends of the chutes are each closed by a wall member 30 to prevent cigars ejected from manifold 10 from passing axially therethrough.

Each of the wall members has an arm 31 supported by the top of an adjacent divider member 24 or 27 and is releasably connected thereto by a threaded fastener means 33. A resilient low density surface 34 is provided on the inner side of each of the members 30 forming a cushion to prevent injury to cigars which may impact thereon when ejected from manifold 10. The members 30 are movable axially toward and away from the feed-in portions M to adjust the length of chutes C depending upon the lengths of the cigars being conveyed. For this, each of the arms 31 have a slot 32 extending parallel to chutes C, through which a fastener 33 extends, to permit movement of members 30 and their arms 31 when fasteners 33 are loosened.

A plurality of parallel rollers 35, in this instance ten, are supported by frame 21 in spaced series between the frame end walls 22 and are parallel to chutes C. Each of the rollers 35 is disposed below a vertical wall 25 or 28 and extends into the chute C which is defined in part by the wall below which it is disposed. Thus, two adjacent rollers 35 extend into each chute C operatively cooperating to form the bottoms of chutes. Slots or cigar feed-outs S are provided in the bottoms of chutes C by the spaces between the cooperating pairs of rollers 35. The rollers 35 of each cooperating pair rotate in opposite directions so their peripheries move downwardly when adjacent the slot S therebetween to feed cigars therethrough.

Rollers 35 are of the cantilevered type and, as best shown in FIGURE 2, each is provided with a shaft 36 which extends through an opening in the frame side wall 23 and has a resilient low density cover 37 which extends from side wall 23 to the other side of frame 21 spaced from manifold 10. Each cover has a low coefficient of friction and may be unitary or, as shown in FIGURES 1 and 2, formed of three sleeves in end to end relation. Thus, chutes C have resilient, low friction bottom surfaces provided by the roller covers 37 to receive cigars and prevent damage thereto. Slots S in the formed bottoms of chutes C are preferably of smaller width than the cigars being conveyed.

Therefore, cigars can be properly alined before transfer to the endless belt conveyor 15. The covers 37 being resilient and of low density, readily deform to locally enlarge slots S to pass cigars therethrough. Tearing of the cigar wrappers by rollers 35 is obviated by movement in the same direction of the peripheries of each operatively cooperating pair of rollers when engaging and feeding a cigar through a slot S together with the low coefficient of friction of covers 37. Additionally, each of the rollers 35 is adjustable toward and away from its cooperating roller to vary the space S therebetween in accordance with the thickness of the cigars being conveyed.

As is best shown in FIGURES 2 and 3, to cantilever and position rollers 35, frame side wall 23 has a surface slot or recess 40 extending horizontally from one end to the other and a plurality of spaced openings 41, one for each roller 35, vertically spaced from slot 40. Each roller shaft 36 extends through a bearing 38 which is supported by a bracket 42 and extends through the proper opening 41 which is of larger diameter than the bearing or is a slot. Each bracket 42 projects into recess 40. A threaded fastener 44 extends through an oversize opening or slot 43 in each bracket 42 and threadedly engages frame side wall 23 to lock the brackets 42 and rollers 35, supported thereby, in position. By virtue of the oversize openings or slots 41 and 43, loosening of a fastener 44 permits limited movement of the bracket 42, held thereby, along recess 40 for adjusting the position of the associated roller 35.

Frame end walls 22 extend past the frame side wall 23, in a direction away from manifold 10, to provide a housing 45 for drive means for rollers 35. Although there are various means suitable for driving rollers 35, a pulley and belt arrangement has been found to be preferable. Towards this end, a pulley 39 is fixed to the end of each shaft in housing 45. A shaft 46, extending through housing 45, is supported by frame end walls 22 and has a driving connection 47, a pulley and belt as shown, at one end thereof. A plurality of spaced pulleys 48 are fixed on shaft 46 each being drivingly connected by a belt 49 to the pulley 39 of one of the shafts 36 in such a manner to drive rollers 35 of each cooperating pair in opposite directions, as desired, when shaft 46 is driven.

To prevent cigars from jamming between the endless belt conveyor 15 and the novel transfer device 20 or from being carried on the top of conveyor 15 when the pockets or recesses 16 thereof are filled, a plurality of gates 51 are provided which depend from the device 20. More particularly, as best shown in FIGURES 2 and 3, gates 51 are disposed below and parallel to only the rollers 35 located on the side of each of the chutes C in the direction of travel of the endless conveyor belt 15. Each of the gates 51 is pivotally connected or suspended at its top from a hinge pin 52. Each hinge pin 52, in turn, is connected at one end to frame side wall 23 and is cantilevered therefrom, or extends outward from frame 21 at its other end for connection to manifold 10.

Referring now to FIGURES 6 and 7, a modified positive transfer device 120, made in accordance with the present invention, has a frame 121 with a pair of spaced side walls 123, corresponding to wall 23, and 123a, corresponding to the open side of frame 21, which are connected to a pair of spaced end walls 122, corresponding to frame end walls 22.

A plurality of U-shaped divider members 127, corresponding to divider members 24 and 27, are supported in spaced series on frame 121 each defining a chute CC, corresponding to chute C of FIGURE 1. The legs of each divider 127, in this instance, provides the spaced parallel vertical walls 128, corresponding to walls 25 and 28, of only one chute CC which extends from the bight of the member 127, adjacent wall 123, towards wall 123a and terminates short thereof. The bight of each member 127 provides a wall 128, corresponding to an end wall 28, for closing one end of a chute CC, defined by such member, which is open at the other end to provide a mouth or feed-in MM, corresponding to a feed-in M, for entry of cigars. As before, each bight or end wall 128 is provided with a resilient low density surface 134, corresponding to an end wall surface 34, to absorb shock or cushion cigars ejected into the associated chute CC.

Each pair of side walls 128 are formed at their top edges for connection to a pair of spaced inverted U-shaped brackets or pins 129, each connected at its ends to frame side walls 123 and 123a, for mounting divider members 127 on frame 121. Each of the members 127 is movable along its associated brackets 129 to vary the size of the chute CC it defines in accordance with the length of the cigars being conveyed. To retain members 127 in desired adjusted positions, a lock ring 131 is provided on one of each pair of brackets 129 and is disposed in a slot 132 in the wall 128 connected to such bracket.

A pair of spaced operatively associated parallel rollers 135, corresponding to rollers 35, are disposed below each pair of walls 128 to provide the bottoms of chutes CC with slots or feed-outs SS therethrough, corresponding to feed-outs S, which are provided by the space between each pair of rollers. Rollers 135, unlike rollers 35, have shafts 136 supported at both ends. However, rollers 135 do have resilient low density covers 137, corresponding to covers 37, with a low coefficient of friction for providing the bottoms of chutes CC with shock absorbing or cushioning means, and for permitting feed-outs SS to readily deform and pass cigars therethrough. Also, the rollers 135 of each operatively cooperating pair rotate in opposite directions to each other for positive feeding of cigars through the feed-out SS therebetween.

Unlike the transfer device 20 of FIGURES 1 to 5, only one of each pair of rollers 135 of the transfer device 120 is positionable to vary or adjust the width of feed-outs SS. Accordingly, as shown in FIGURE 6, the shaft 136 of one of each pair of rollers 135 is rotatably mounted in bearings 138 in frame side walls 123 and 123a. However, the shaft 136 of the other of each pair of rollers 135 is rotatably mounted at each end in a similar bearing 138 in a bracket 142 having a slot 143 that extends transverse to the axis of the shaft 136.

A threaded fastener 144 extends through each slot 143 to releasably connect brackets 142 inside frame wall 123a and outside frame wall 123. Brackets 142 are disposed inside wall 123a to provide transfer device 120 with a flat unobstructed face to abut manifold 10, and outside wall 123 to prevent their interfering with divider members 127. Accordingly, wall 123 has a series of spaced oversize openings or slots 141 for passage of shafts 136 to brackets 142. By virtue of slots 141 and 143, loosening fasteners 144 permits limited lateral movement of brackets 142 relative to walls 123 and 123a for moving one of each pair of rollers 135 for varying the width of feed-out SS.

While not shown, transfer device 120 may be provided with depending gates corresponding to gates 50 of transfer device 20.

Although several embodiments of the invention have been illustrated and described in detail, it is to be expressly understood that the invention is not limited thereto. Various changes in the design and arrangement of parts may be made without departing from the spirit and scope of the invention as the same will now be understood by those skilled in the art.

We claim:

1. In a cigar conveyor system having a plurality of pneumatic ducts to feed cigars lengthwise and an endless belt conveyor moving transverse to the ducts and having pockets therein substantially parallel to the ends of the duct to receive cigars therefrom, a cigar transfer and positive feed device comprising a plurality of chutes vertically spaced above the endles belt conveyor substantially parallel to the pockets thereof and to each other, each of the chutes being longitudinally alined with one of the ducts and having an in-feed at one end adjacent the alined duct to receive cigars delivered thereby, a plurality of resilient low density impact members each disposed across the other end of one of the chutes opposite from the in-feed to block cigars from passing longitudinally through the chutes and to prevent injury to the cigars blocked thereby, and means for defining the bottoms of the chutes each with an out-feed therethrough substantially parallel to the pockets of the conveyor passing therebeneath and for positively feeding cigars through the out-feeds from all of the chutes to the pockets of the endless belt conveyor.

2. The cigar transfer and positive feed device in accordance with claim 1, further comprising a substantially rectangular frame, a plurality of spairs of spaced vertical walls extending substantially parallel to the ends of the ducts and to each other and being connected to the frame in spaced series to define the plurality of chutes, and a plurality of end walls singly disposed between the pairs of spaced vertical walls each being connected to at least one of the walls between which it is disposed and having resilient low density material connected thereto to provide the plurality of impact members.

3. The cigar transfer and positive feed device in accordance with claim 2, the means comprising a plurality of parallel rollers rotatably connected in pairs to the frame and being disposed below and parallel to the pairs of spaced vertical walls to define the bottoms of the chute, the rollers of each connected pair being spaced from one another with the spaced adjacent portions thereof defining the out-feed through the bottoms of the chutes, and drive means connected to the rollers for rotating the rollers of each connected pair opposite to one another each in a direction to move the portions thereof defining the out-feeds toward the endless belt conveyor.

4. The cigar transfer and positive feed device in accordance with claim 3, wherein the space between each connected pair of rollers is smaller than the thickness of the cigars to be passed therethrough, and the rollers have covers of resilient low density material with a relatively low coefficient of friction to deform and prevent tearing of the wrappers of cigars as they are positively fed therethrough, and means for adjusting the relative positions of the rollers of each connected pair to vary the space therebetween.

5. The cigar transfer and positive feed device in accordance with claim 4, further comprising a plurality of gates hinged in spaced series to the frame and depending therefrom, each of the gates being disposed parallel to the vertical walls and at the side of one of the chutes in the direction of movement of the endless belt conveyor.

6. The cigar transfer and positive feed device in accordance with claim 2, wherein the frame is open on one side thereof adjacent to the ducts, and further comprising a plurality of inverted U-shaped members connected in spaced series each at one end to the side of the frame opposite from open side thereof, a pair of inverted L-shaped members each connected to one side of the frame at one end of the open side thereof and spaced from last inverted U-shaped member of the series adjacent the side of the frame to which it is connected, the legs of each inverted U-shaped member providing one wall of each of two adjacent pairs of spaced vertical walls, the leg of each inverted L-shaped member each providing one wall of a pair of spaced vertical walls having the other wall thereof provided by the adjacent inverted U-shaped member spaced therefrom, and the end walls being singly connected to each of the inverted U-shaped members and to one of the inverted L-shaped members.

7. The cigar transfer and positive feed device in accordance with claim 6, wherein each of the end walls is independently movable toward and away from the ducts to vary the lengths of the chutes independently of one another, and further comprising means for singly releasably locking the end walls to the inverted members to which they are connected.

8. The cigar transfer and positive feed device in accordance with claim 6, the means comprising a plurality of rollers rotatably connected in pairs each at one end to the side of the frame opposite from the open side thereof and being disposed below and parallel to the pairs of spaced vertical walls to define the bottoms of the chute, the rollers of each connected pair being spaced from one another with the spaced adjacent portions thereof defining the out-feed through the bottoms of the chutes, and drive means connected to the rollers for rotating the rollers of each connected pair opposite to one another each in a direction to move the portions thereof defining the out-feeds toward the endless belt conveyor.

9. The cigar transfer and positive feed device in accordance with claim 1, further comprising a plurality of U-shaped members disposed in spaced series defining the chutes each alined with one of the ducts, each of the U-shaped members having a bight disposed on the side of the frame opposite from the ducts to provide the end wall of one of the chutes with its vertical walls provided by the legs of the U-shaped member extending from the ends of the bight toward the ducts, and a plurality of pairs of inverted U-shaped brackets, each pair of brackets being connected at the bights thereof to the legs of one of the U-shaped members and at the free ends of the legs thereof to the frame to connect the vertical walls thereto.

10. The cigar transfer and positive feed device in accordance with claim 9, wherein each of the U-shaped members are movable toward and away from the alined on the brackets connected thereto to vary the length of the chute it defines independently of the other chutes, and means for singly releasably locking each U-shaped member to at least one of the brackets connected thereto to prevent movement of the U-shaped member.

References Cited by the Examiner
UNITED STATES PATENTS
2,822,953    2/1958   Kunath _____ 198—32

EVON C. BLUNK, *Primary Examiner.*

E. A. SROKA, *Assistant Examiner.*